(12) United States Patent
Beaulieu

(10) Patent No.: US 7,114,668 B2
(45) Date of Patent: *Oct. 3, 2006

(54) CONSTRUCTED WETLANDS SYSTEM, TREATMENT APPARATUS AND METHOD

(75) Inventor: Edgar Beaulieu, Sugar Grove, IL (US)

(73) Assignee: Aquascape Design, Inc., Batavia, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/804,622

(22) Filed: Mar. 19, 2004

(65) Prior Publication Data

US 2004/0173523 A1 Sep. 9, 2004

Related U.S. Application Data

(62) Division of application No. 10/138,974, filed on May 1, 2002, now Pat. No. 6,740,232.

(51) Int. Cl.
*B05B 1/18* (2006.01)
(52) U.S. Cl. ............... 239/567; 239/207; 239/266; 239/273; 239/275; 239/279; 239/562; 239/565; 239/566; 210/151; 210/169; 210/170
(58) Field of Classification Search ............ 239/207, 239/208, 266–268, 273, 275, 279, 536, 556, 239/562, 565, 566, 567, 200, 201; 210/150, 210/151, 169, 170, 605
See application file for complete search history.

(56) References Cited

U.S. PATENT DOCUMENTS 444,564 A * 1/1891 Copeland ............... 239/565
4,364,830 A * 12/1982 Roberts ................. 210/268

(Continued)

OTHER PUBLICATIONS

Aquascaper, Winter 2000 (full magazine).

(Continued)

*Primary Examiner*—Steven J. Ganey
(74) *Attorney, Agent, or Firm*—James B. Conte

(57) ABSTRACT

A system, apparatus and method for treating water in a landscape pond so as to enhance the water clarity, where the water to be treated is delivered to a treatment pond to reduce the particulate matter and nutrient level of the water. The treatment pond includes a nutrient level reducing vegetation, facultative bacteria, substrate material for the bacteria (usually gravel) and a treatment apparatus. The treatment apparatus includes a generally vertically disposed hollow and cylindrical stack formation which extends between the treatment pond bottom and surface and defines at least one (1) coupling construction. At least one (1) elongated and generally horizontally disposed water disbursing module is positioned on the pond bottom and coupled to the stack formation. The disbursing module includes a flat bottom, an arcuate upper surface having a plurality of exit apertures therein and a pair of end formations, all of which define a passageway. In operation water flows from the decorative pond into the disbursing module. There due to geometry and pressure and velocity differences, particulate matter separates from the water and is deposited on to the disbursing module bottom and stack bottom. Water exits the exit apertures and travels through the substrate or gravel, is exposed to the nutrient level reducing vegetation and facultative bacteria and then returns to the decorative pond. The stack is provided with a sealing and removable cover which permits access to the stack bottom so as to remove sediment and particulate matter which has collected in the disbursing module bottom and/or stack bottom.

39 Claims, 5 Drawing Sheets

U.S. PATENT DOCUMENTS

| | | | |
|---|---|---|---|
| 4,562,963 A * | 1/1986 | Butler | 239/273 |
| 4,997,568 A | 3/1991 | Vandervelde | |
| 5,314,619 A | 5/1994 | Runyan | |
| 5,330,652 A | 7/1994 | Goldman | |
| 5,584,991 A | 12/1996 | Wittstock et al. | |
| 5,893,975 A | 4/1999 | Eifert | |
| 5,897,777 A | 4/1999 | Zoeler | |
| 6,024,670 A | 2/2000 | Kitagawa | |
| 6,277,274 B1 | 8/2001 | Coffman | |
| 6,740,232 B1 * | 5/2004 | Beaulieu | 210/170 |

OTHER PUBLICATIONS

Advanced Construction Techniques p. 6 & 7, Aquascape Designs, Inc. Copyright 1998.

* cited by examiner

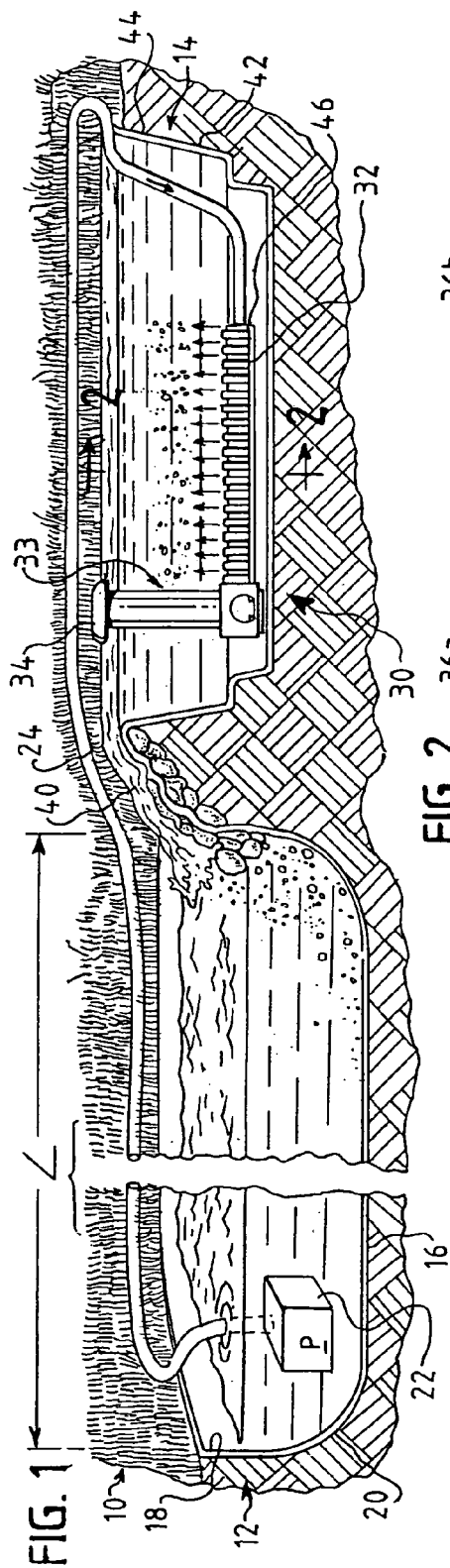
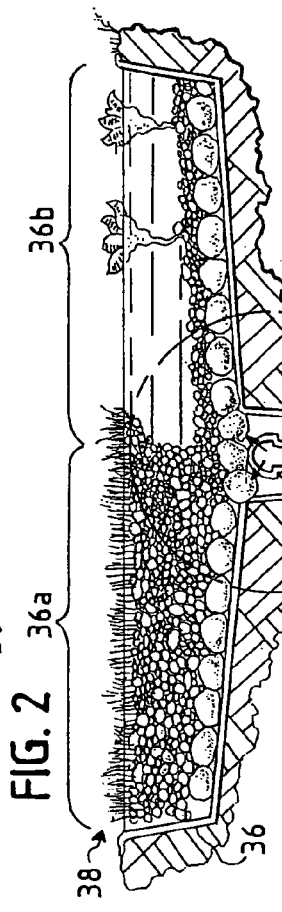
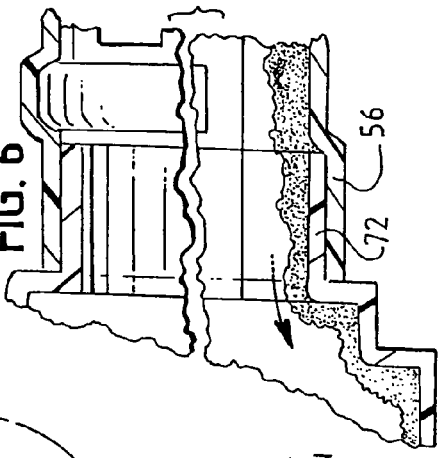
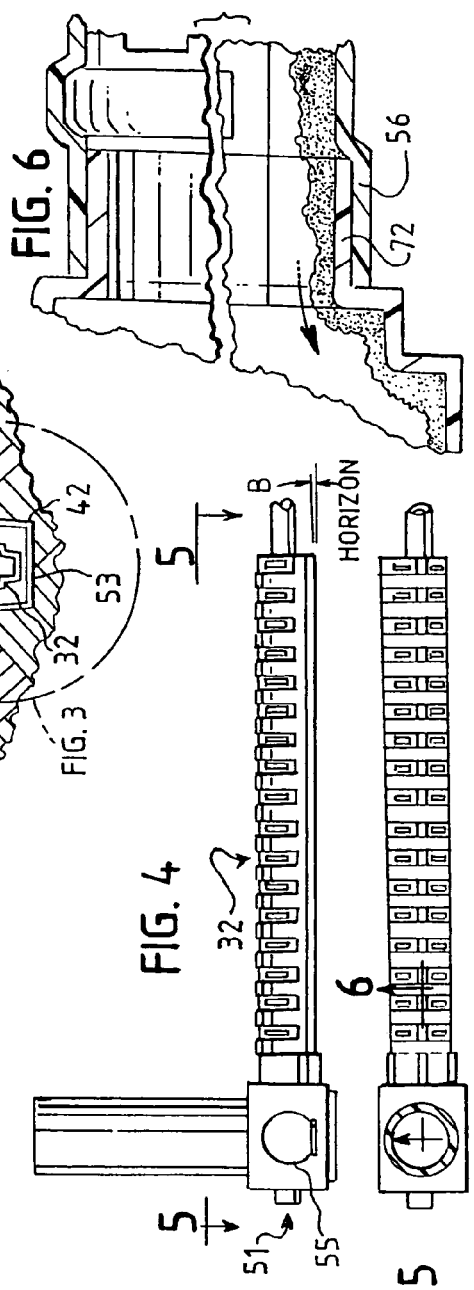
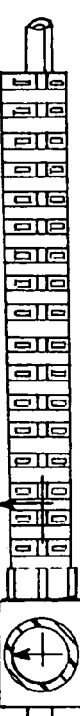
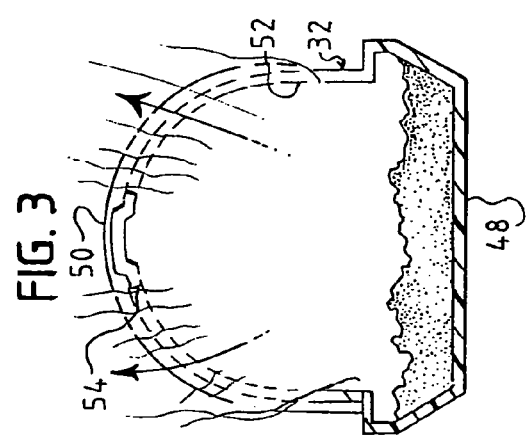

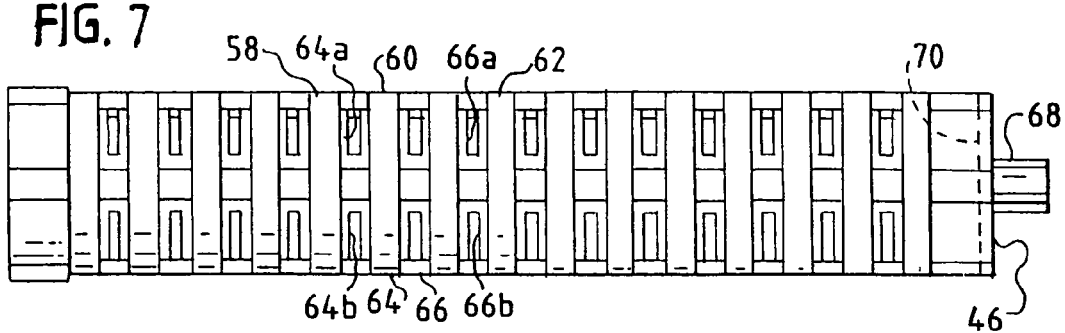
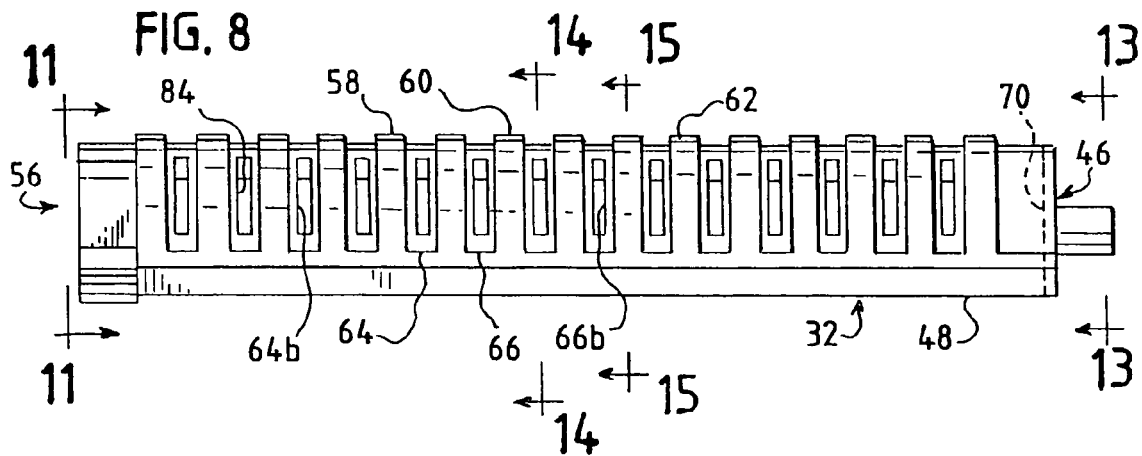
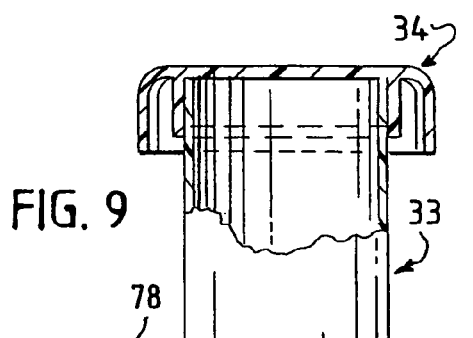
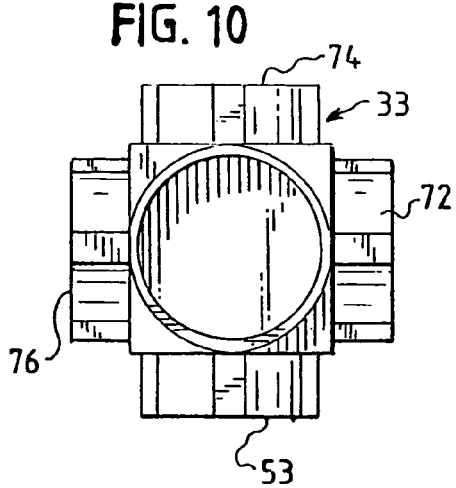

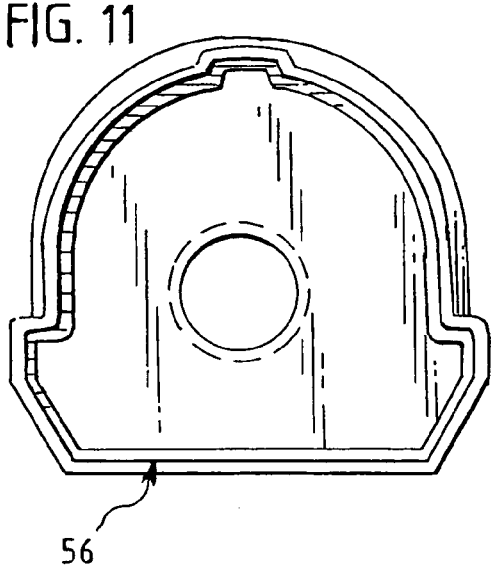
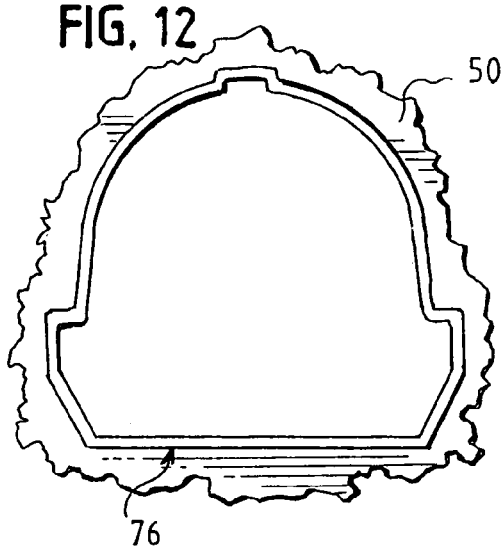
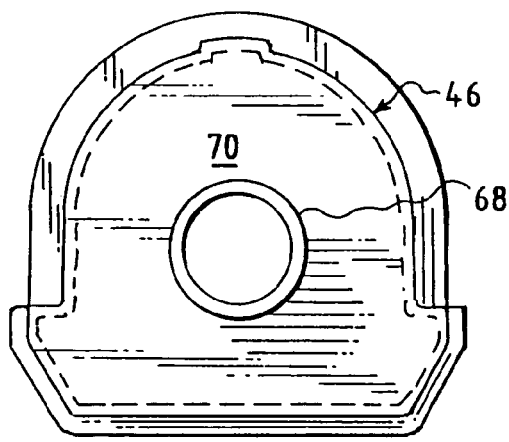
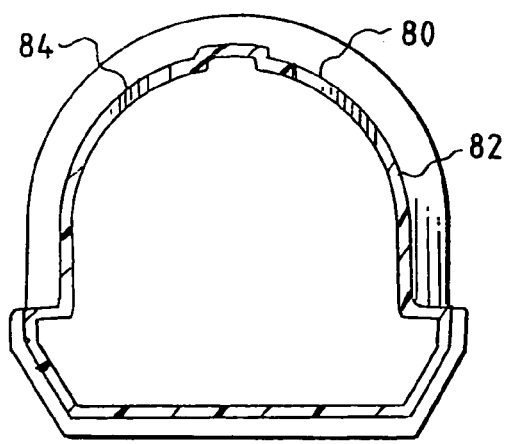
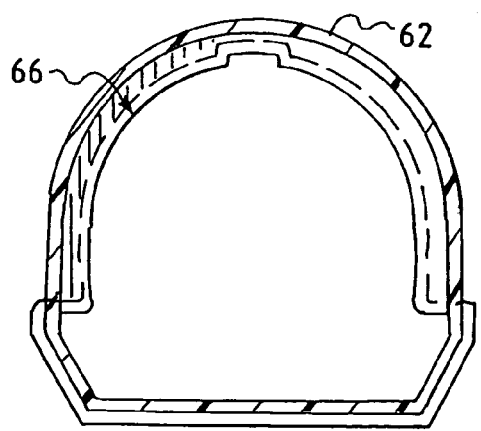

CONSTRUCTED WETLANDS SYSTEM, TREATMENT APPARATUS AND METHOD

CROSS-REFERENCE TO RELATED APPLICATION

This application is a divisional of parent application Ser. No. 10/138,974 filed on May 1, 2002. The priority of the parent application is claimed. The benefits of 35 U.S.C. §120 and 121 are also claimed. The parent application has now issued as U.S. Pat. No. 6,740,232 on May 25, 2004.

FIELD OF THE INVENTION

This invention relates to a water treatment system, apparatus and method used in connection with treating water in pond, particularly a decorative landscape type pond.

BACKGROUND OF THE INVENTION

The use of ponds as a decorative landscape feature is becoming increasingly popular. One of the desirable features of such a pond is the ability to view fish and plants therein, as well as a clean and attractive bottom. It is also desirable to provide an environmentally friendly system which may attract various animals and insects. Thus, clear water is a desirable feature. But the viewability can be hampered by cloudy water which in many cases is caused by excess algae buildup. This buildup may be the result of excess nutrients, such as total nitrogen and phosphorus, beyond acceptable levels which may be caused by animal waste products, fertilizer run off, chemical additions and the like.

Chemicals such as chlorine or copper based compounds can be added to the pond to control the nutrient level or to destroy the algae. But these chemicals could adversely impact the plants and fish, tend to break down rapidly, require repeated applications, may be expensive and may require extensive balancing to assure the proper water chemistry.

Thus, it is an object of this invention to control the clarity of decorative pond water without reliance on chemical additives.

Filtration systems, which may include a skimmer system, have been employed to remove leaves and other matter that may fall onto the pond surface. However, such matter may fall to the pond bottom to form sediment or break up into particulate matter which may be suspended or also form sediment. These filters act to skim the surface matter and may remove some of the nutrients and particulate matter.

However, it is desirable to more effectively remove nutrients, particulate matter and sediment so as to enhance the viewability.

The use of natural processes of the type associated with wetlands, where aquatic plants utilize and/or remove nutrients is desirable. Various processes have been suggested by which these plants bioaccumulate and remove the nutrients that directly or indirectly degrade the water quality. Wetlands occur in nature and are used to cleanse lake and river water. Recently, constructed wetland features have come into use.

Thus, it is another object to employ a constructed wetlands feature with a decorative pond system to enhance viewability.

These and other objects will become apparent from the following description and appended claims.

SUMMARY OF THE INVENTION

The system, apparatus and method of this invention meet the foregoing objects, enhance water clarity, reduce nutrient level, minimize the use of undesirable chemical additives, remove undesirable suspended and settled matter and employ the use of a constructed wetlands.

In this invention, there is a main body of water or decorative pond and a treatment or constructed wetlands pond. The ponds are usually separate, but may be sections or zones of a single body of water. The wetlands pond includes a treatment apparatus which (A) receives water from the main pond, (B) disburses received water into the treatment pond, and (C) collects particulate matter. The wetlands pond also includes: facultative bacteria; a substrate (such as gravel) for the bacteria; vegetation or aquatic plants to utilize the nutrients and reduce the nutrient level; and a device for the return of treated water to the main pond usually by gravity. Such a device may be a waterfall feature.

The treatment apparatus includes (1) an elongated disbursement module that defines a passageway, a flat bottom, a water inlet end, an outlet end, and arcuate upper surface joined to the bottom with a series of exit apertures in the upper surface and (2) a hollow, cylindrical stack-like structure for use in cleaning a module which is coupled to the stack and the stack also includes a cap that sealingly engages the top of the stack.

Water from the main or decorative pond is pumped to the inlet end of the disbursement module and flows through the disbursement module. Due to gravity, pressure and velocity differences, particulate matter in the water will fall to the flat bottom. The remaining water exits the disbursement module through exit apertures in the module where it flows into the wetlands pond and the bacteria, substrate and vegetation act to reduce the nutrient level in the water. The sedimented and reduced nutrient level water may be returned to the main pond by an overflow or waterfall system that may add oxygen to or oxygenate the water. The treatment system and apparatus are operated continuously so as to continuously reduce sediment and nutrient levels.

Periodically the system is cleaned via the stack. When the cap on the stack is removed, water flows to the bottom of the stack with sediment therein which collects on stack bottom. Thus, by scooping, vacuuming or pumping techniques, sediment at the bottom of the stack can be removed.

Several different treatment configurations can be assembled by adding additional treatment modules to the stack. These configurations can include a cross like configuration useful in a large pond.

BRIEF DESCRIPTION OF THE DRAWINGS

FIG. 1 is a view showing the decorative pond, the treatment pond with the treatment apparatus therein, and water being pumped from the decorative pond to the treatment pond;

FIG. 2 is a sectional view along line 2—2 of FIG. 1 and showing (on one side) the interior of the pond with part of the pond shown filled with gravel and (on the other side for illustrative purposes) the other part of the pond not completely filled with gravel;

FIG. 3 is an enlarged view taken from FIG. 2 showing the disbursement module in cross section;

FIG. 4 is an elevational view of the treatment apparatus showing the stack and disbursement module;

FIG. 5 is a sectional view taken along line 5—5 of FIG. 4 showing the stack in cross section and the upper surface of the disbursement module;

FIG. 6 is a sectional view taken along line 6—6 of FIG. 5 showing the outlet end of a disbursement module coupled to the stack;

FIG. 7 is a plan or top view of a disbursement module showing the upper surface thereof;

FIG. 8 is a side or elevational view of a disbursement module as in FIG. 7;

FIG. 9 is a side or elevational view of the stack showing the stack and cover therefore;

FIG. 10 is a top view of the stack without the cover;

FIG. 11 is a view taken along line 11—11 of FIG. 8 showing the outlet end of the disbursement module;

FIG. 12 is a view taken along line 12—12 of FIG. 9 showing a coupling portion of the stack constructed to couple to the outlet end of the disbursement module;

FIG. 13 is a view taken along line 13—13 of FIG. 8 showing the inlet end of the disbursement module;

FIG. 14 is a vertical sectional view taken along line 14—14 of FIG. 8 showing an aperture web section and exit apertures;

FIG. 15 is a sectional view taken along line 15—15 of FIG. 8 showing a rib construction for the disbursement module;

DESCRIPTION OF THE PREFERRED EMBODIMENT

Figure 16:
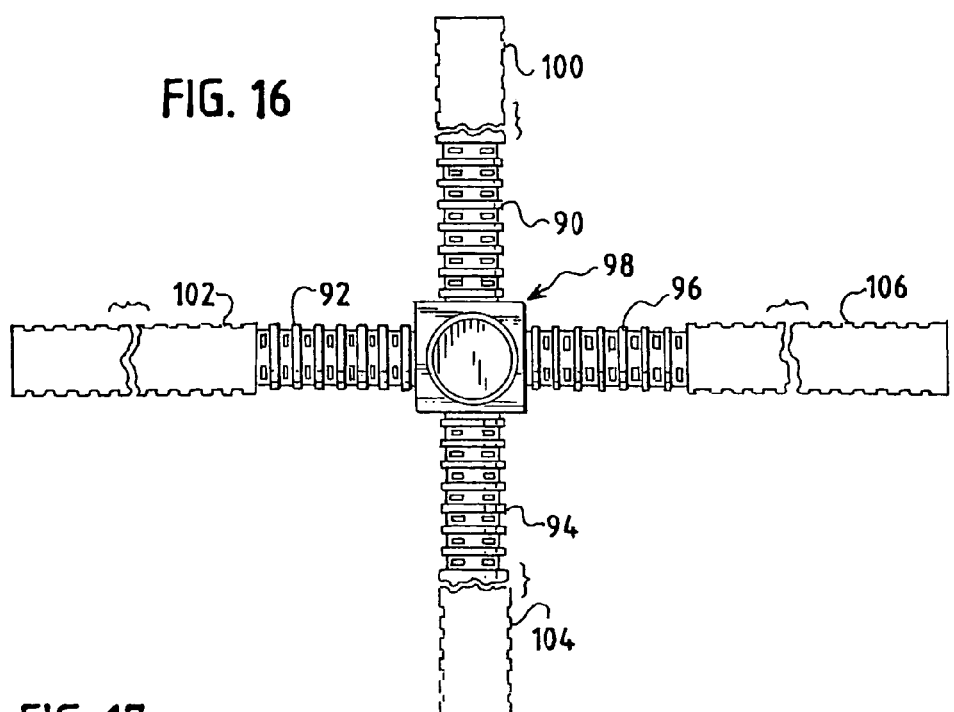
FIG. 16 is an elevational view showing the stack and disbursement modules in a cross like configuration.

There is disclosed herein a pond system 10 generally which includes a main or decorative pond 12 generally and a treatment or wetlands pond 14 generally.

The main or decorative pond is formed by a large (i.e. fractional or multi-acre) excavated recess which forms a bottom 16 and sides 18. A water impermeable liner 20 is positioned in the recess against the bottom 16 and sides 18. The liner 20 is intended to minimize water loss from the pond to the adjacent ground. If needed, the liner can be plastic, rubber, clay, concrete or the like.

A submersible pump 22 positioned in the decorative pond 12 connects to the conduit 24 and directs flow from the decorative pond 12 to the treatment pond 14. The conduit 24 is usually about 3.5 inches in diameter. It is understood that the pump is in a protective housing to minimize clogging while permitting water flow to the pump. As an alternative, there can be used an in-line above ground pump to draw water from the decorative pond and discharge to the wetlands pond.

The decorative pond is filled with water which can be stocked with fish, and appropriate decorative vegetation. One of the desirable attributes of decorative ponds such as 12 is the viewability of the pond and its contents and thus the clarity of the water therein.

Algae may grow in the pond but if the growth becomes excessive the algae can cause the water to become cloudy or less clear and even cause the pond to turn to an undesirable color. Algae growth relates to the nutrient (e.g. total nitrogen and phosphorus) level in the pond and in turn from animal waste products, fertilizer run off, chemical additions etc.

Moreover, leaves or other objects that fall into the pond can settle to the bottom or can break up and form particles that are either suspended in the water or collect on the bottom.

In the wetlands pond 14 there is provided a treatment apparatus 30 generally which includes a horizontally positioned disbursement module 32 that is connected to the conduit 24. The treatment apparatus 30 also includes a vertical stack 33 that is closed at the top by a cap 34 and is positioned to extend from the pond bottom to above the top surface. The pond also includes a substrate for the growth of desirable bacteria, usually a gravel bed 36 which substantially fills the pond 14, as shown in FIG. 2. Aquatic vegetation 38 is shown growing on the top of the pond. For ease of illustration, FIG. 2 shows the pond entirely filled with gravel, vegetation and water on the left hand side 36a, while only a small portion of the gravel bed 36 and vegetation are shown on the right hand side 36b. It will be understood that the pond is entirely filled with gravel, vegetation and water. Nutrient level reducing facultative bacteria adheres to the gravel and thus is in contact with the water to be treated. The gravel provides a base or supportive substrate for the bacteria, but other materials can be used.

It will be understood that water is drawn from the decorative pond 12 by the pump 22, directed to the treatment pond through the conduit 24 and disbursed into the module 32. The particulate matter separates by gravity and the remaining water then flows from the disbursement module into the gravel, the water thereinabove, and is in contact with the bacteria and the vegetation. The water is thus treated to reduce sediment and reduce nutrient level. Treated water then flows from the treatment pond 14 perhaps via the waterfall feature, such as 40, to the main pond 12.

The wetlands pond 14 is usually smaller than the landscape pond, perhaps about 5% of the area, and may be 15 feet or more in diameter and 18 inches to 24 inches deep. Also, the wetlands pond is excavated and includes a sloping bottom and a trough 42, or channel like construction, centered in the bottom of the wetlands pond. Moreover, the wetlands pond may be above the landscape pond, as shown, or at a similar height as the landscape pond.

A liner 44 (such as plastic, rubber, concrete or clay) is positioned in the wetlands pond against the sides, bottom and trough. The treatment assembly 30 and particularly the disbursement module 32 is positioned in the trough and defines an elongated flow passageway, sediment collector and water exit apertures. The module 32 is coupled at its inlet end 46 to the smaller diameter conduit 24 from the pump 22. There is a substantial difference in the cross sectional size and shape (i.e. geometry) of the disbursement module 32 and the conduit 24. Thus, water flows from a small conduit to a large passageway and results in a substantial pressure drop and decreases in velocity, between the conduit 24 and module 32. The module 32 as seen in FIG. 3, has a flat bottom 48 and curved or arcuate upper portion 50 that is joined to the flat bottom. The arcuate portion 50 defines water exit apertures such as 52 and 54. The bottom 48 of the module 32 rests in the trough 42 and couples to the base of the stack 33.

In general the operation of the system 10 can be described as follows. Water is drawn from the pond 12 by the pump 22. The water is pumped via conduit 24 to the disbursement module inlet end 46. Due to the changes from the conduit 24 to the disbursement module 32 water passing from the conduit to the module experiences a drop in pressure and a drop in velocity. This allows particulate matter to separate from the water and be drawn by gravity to and collect on the flat bottom 48. The water, from which the sediment has been deposited, flows from the disbursement module 32 through the exit apertures 52 and 54 into the treatment pond 14. There water flows through a gravel bed 36 and is exposed to the facultative bacteria and nutrient level reducing aquatic vegetation 38. The action of the gravel, bacteria and vegetation reduce the nutrient level in the water. Then the water which has a reduced nutrient level and reduced sediment level is returned to the landscape pond via the waterfall feature 40, which can add oxygen to or oxygenate the water. As opposed to the original or untreated water, the returned or treated water has reduced sediment content, reduced nutrient level and may have an increased oxygen content. Continued treatment cooperates in maintaining clarity of the water in the decorative pond by reducing nutrient levels and thus algae growth.

Referring now to FIG. 2, the disbursement module 32 is shown in the trough 42 in the bottom of the wetland pond 14. The disbursement module is positioned in, but rests slightly above the trough bottom and at a small angle. This is because the stack 33 includes a base/connector portion 51, is resting on the bottom 53 of the trough 42 and is slightly below the disbursement module 32. The trough is at a slight angle, so as to assure a slight downward slope to the disbursement module 32. The stack base/connector 51 includes a port or coupling opening such as 55 that is constructed to receive an end of the disbursement module 32 and couple thereto as shown in FIG. 6. The stack base/ portion 51 is positioned on the bottom 53 so that sediment in the disbursement module such as 32 can be washed into the stack base/connector for removal.

As seen in FIG. 2, the gravel bed includes large gravel (4" to 6" in diameter) on the bottom, medium gravel (1½ to 2" in size) resting on the large gravel and pea gravel (½" in diameter) on the medium gravel. This gravel fills the treatment pond 14 and covers the disbursement module 32. Rather than gravel, other biological media such as coconut fiber plastic ribbon, can be used as the substrate for the bacteria.

A typical module 32 is seen in FIGS. 7 and 8. It includes an inlet end 46 and outlet end 56, is elongated and between the inlet and outlet ends, includes a plurality of ribs such as 58, 60 and 62 and a plurality of aperture web sections such as 64 and 66 which include exit apertures 64a, 64b, 66a and 66b. The inlet end 46 is provided with a short conduit stub 68 that is adapted to be connected to the conduit 24. The inlet end of the disbursement module 32 also includes an end wall 70 which closes the end except for the opening made by the conduit stub 68. Thus, water entering the disbursement module 32 by the conduit stub 68 experiences a drop in velocity and a drop in pressure which permits a separation of sediment and particulate matter. Each of the pressure drop and the velocity drop are on the order of 92.5%. Water continues to flow through the passage way and exits the disbursement module via the apertures such as 64a, 64b, 66a and 66b. The other end of the disbursement module includes an outlet end which does not have a wall and is open. The outlet end is sized to engage a coupling on the stack 33. The bottom 48, the inlet end 46, the outlet end 56, the ribs 58, 60 and 62, and the aperture web sections 64 and 66 are seen in FIG. 8.

The stack 33 is seen FIGS. 9 and 10 and a top cap 34 is seen in FIG. 9. The stack includes a plurality of couplings such as 55, 72, 74 and 76 spaced about the stack periphery as seen in FIG. 10. A disbursement module couples to the stack by the outlet end 56 fitting over and sealing against the stack coupling 72. The outlet end 56 is slightly larger than the stack coupling 72. The stack base or lower portion 51 is square and includes the couplings. The upper portion 78 is cylindrical and extends above the pond surface. The cap 34 sealingly engages the top of the stack and is removed for cleaning and removal of sediment. When the cap is removed, air pressure inside and outside the stack equalizes, water flows from the disbursement module into the stack bottom and sediment collects on the stack bottom. From there the sediment can be scooped out or removed by a pump etc.

Referring now to FIG. 11, the outlet end 56 is seen and can be characterized as a female end which is about 10$\frac{1}{25}$" high and 12" wide. That female end connects as seen to the male portion of the stack coupling 72.

Referring now to FIG. 13, the inlet end 46 is shown with the conduit stub 68 and end wall 70.

The rib construction, such as 62, is shown in FIG. 15 and the aperture web construction 80 is seen in FIG. 14. A pair of water flow apertures 82 and 84 are seen in the construction.

A cross shaped apparatus is shown in FIG. 16 where there are provided at least four (4) disbursement modules 90, 92, 94 and 96 connected to the stack 98. In broken line additional modules such as 100, 102, 104 and 106 are shown attached to the end of the modules 90, 92, 94 and 96. A cross shaped system such as this can be used where the decorative pond is very large and the treatment pond is relatively large.

Figure 17:
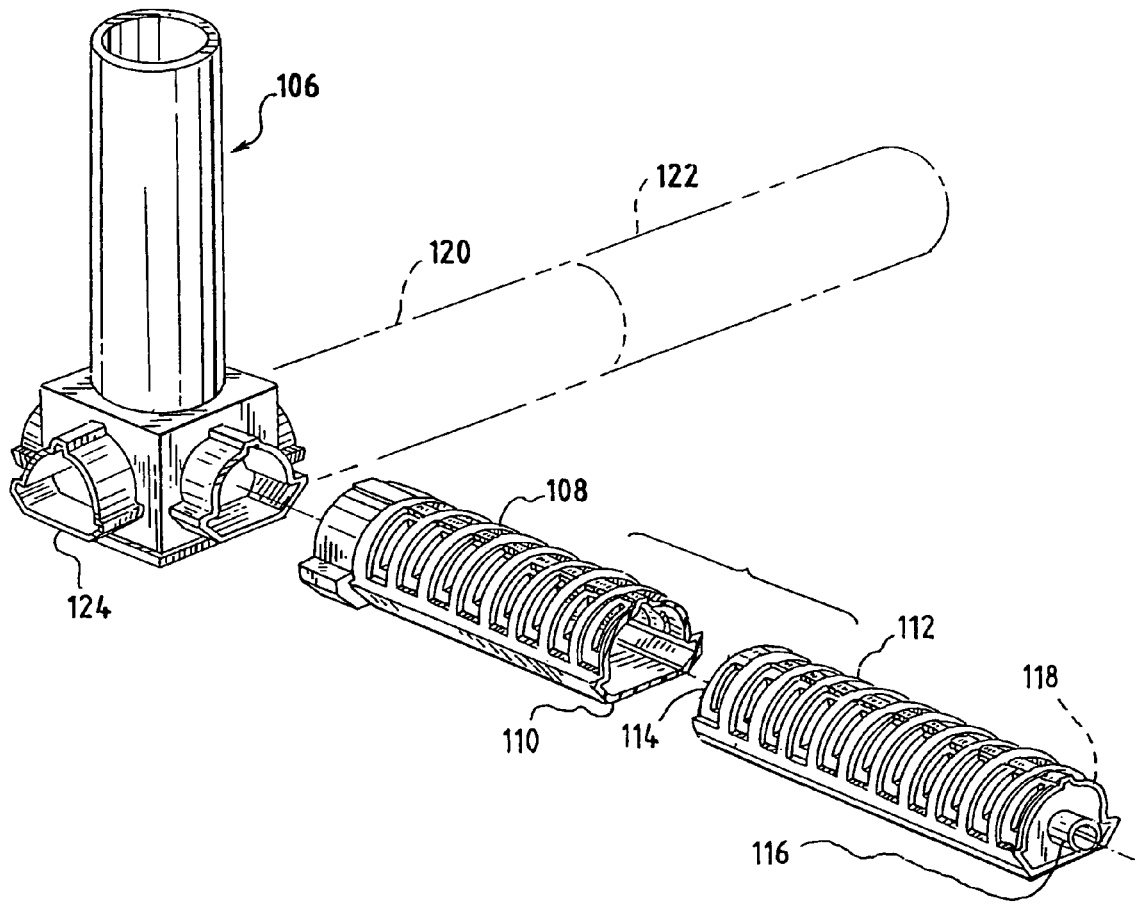
FIG. 17 is a perspective like view showing a stack and disbursement modules at right angles with one module and extender is solid line and the other in broken line.
Figure 18:
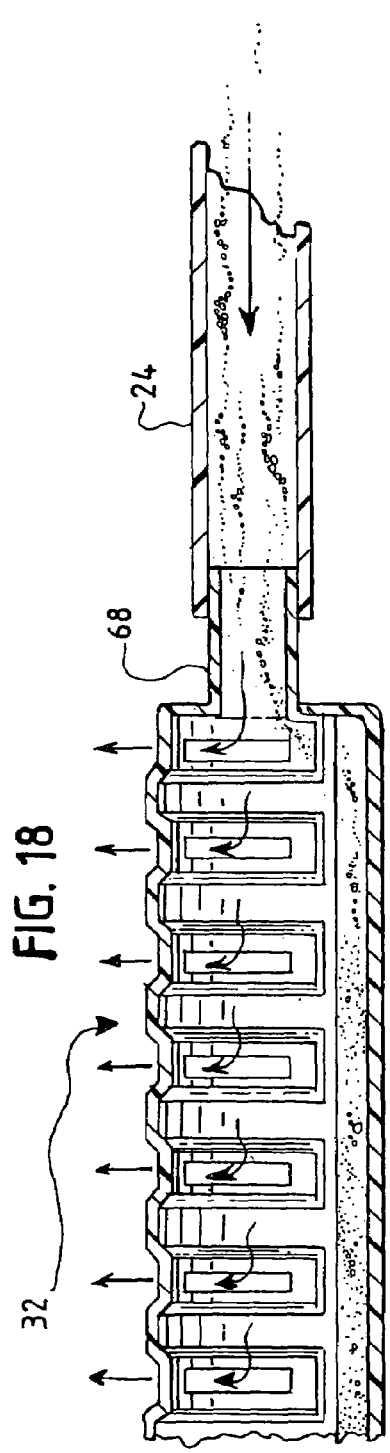
FIG. 18 is an elevational view showing a conduit coupled to a disbursement module with the flow therethrough.

Another form of the apparatus is shown in FIG. 17. There the stack 106 is shown for connection to the disbursement module 108. In this situation, the disbursement module's inlet end 110 has been cut so as to remove its end wall and connector stub. A second module 112 is fitted to the first module 108 and the additional module 112 has an outlet 114 which fits over and grasps the inlet end 110 of the dispersion module 108. The inlet end of the second module is shown and includes the conduit stub 116 and end wall 118. In broken line two (2) other disbursement modules 120 and 122 are shown and suggest that the modules can be formed in an L or right angular shape. It is to be understood that in the stack of FIG. 17 couplings such as 124 which are not used are closed off by a wall and there is no flow through those couplings.

The operation of the system and the wetlands pond has been discussed hereinbefore. However, it is desirable to periodically maintain the system by removing sediment that may build up in the stack or disbursement modules. In that case, the cover is removed 34 and water is permitted to flow into the stack and wash sediment into the stack from the modules as suggested in FIG. 6. The sediment in the base of the stack is then removed by scooping or vacuuming. It has been found that a wetlands system which employs the treatment system of this invention to cleanse the water cooperates with the main pond in maximizing clarity and low nutrient level of the water in the main pond.

In a one module system such as shown in FIGS. 1, 5, 6, 7, 8 & 18 the water in the conduit 24 flows at about 3,600 gallons per hour (gph). If additional modules are used, the flow rate is increased by 3,600 gph for each additional module. The area of the exit apertures from each module is sized to assure that quantity of water that exits the module is about the same as enters the module. Thus, there is about 1.1 ratio between entering volume and exiting volume. Because of the significant change in geometry and size from the conduit to the module the water velocity and pressure drops significantly. This permits particulate matter in the water to separate and precipitate to the module bottom. The remaining water can flow from the exits apertures.

Figure 19:
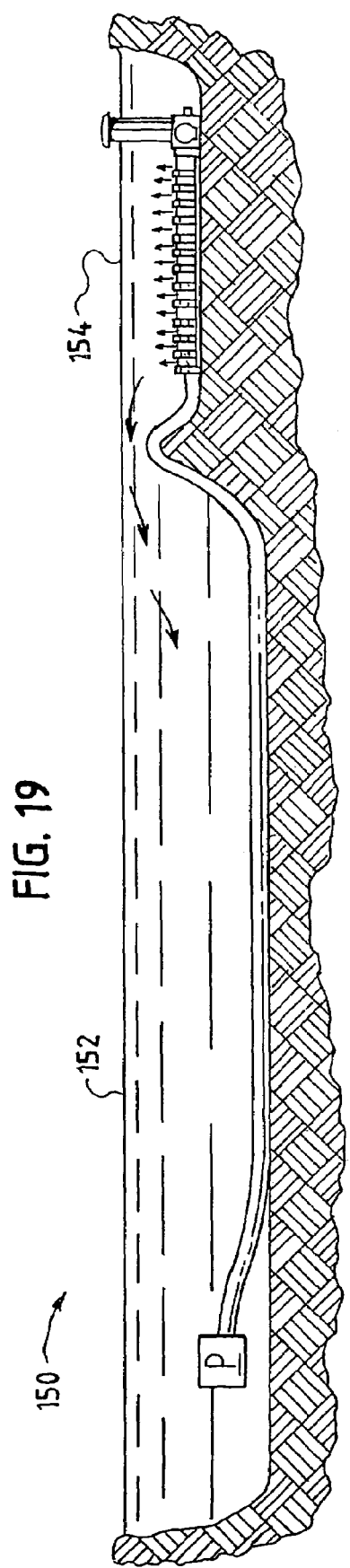
FIG. 19 is a section view of a single pond that includes both a decorative zone and a treatment zone.

The decorative and wetlands ponds can be separate but at the same height. As shown in FIG. 19, a single pond 150 can have a decorative zone 152 and a separate but unitary wetlands zone 154 which includes a treatment apparatus, gravel, facultative bacteria and an aquatic vegetation as described before.

Other and numerous changes and modifications can be made to the embodiments disclosed herein without departing from the spirit and scope of this invention.

What is claimed and desired to be secured by Letters Patent is:

1. An apparatus for the collection and distribution of water comprising,
    an elongated, tubularly-shaped and horizontally-positioned module through which water can flow, having a bottom portion, an upper portion which is arcuately shaped and defines a plurality of flow apertures, and said module having a pair of ends, with a fluid coupling construction at one end, and
    an elongated, tubularly-shaped and vertically-positioned stack, said stack having a base portion and a body portion, (a) said base portion (1) having a fluid coupling construction adapted to engage the fluid coupling construction on the module so as to form a fluid coupling assembly for the flow of water between the module and the stack, and (2) defining a base portion cross sectional area and (b) said body portion of said stack constructed (1) to extend vertically upwardly from the base portion, and (2) defining a body portion cross sectional area,
    wherein the base portion cross sectional area is at least as large as the body portion cross sectional area, and
    wherein water can flow between the module and the stack through the fluid coupling assembly.

2. An apparatus as in claim 1 wherein each fluid coupling construction includes a tubularly-shaped member and said members are constructed to interfit with each other so as to form the fluid coupling assembly.

3. An apparatus as in claim 2 wherein the stack and the module form a unit having an L-like shape.

4. An apparatus as in claim 2 wherein the bottom portion of the horizontally-positionable module is substantially flat.

5. An apparatus as in claim 4 wherein, in cross section, the height of the horizontally-positioned module is about 10 inches and the width of the module is about 12 inches.

6. An apparatus for the collection and distribution of water comprising,
    an elongated, tubularly-shaped and horizontally-positioned primary module through which water can flow, having a bottom portion, an upper portion which is arcuately shaped and defines a plurality of flow apertures, and said module having a pair of ends, with a fluid coupling construction at one end, and
    an elongated, tubularly-shaped and vertically-positioned stack, said stack having a base portion and a body portion, said base portion having a fluid coupling construction and adapted to engage the fluid coupling construction on the module so as to form a fluid coupling assembly for the flow of water between the module and the stack, and said body portion of said stack constructed to extend vertically upwardly from the base portion, so that water can flow between the module and the stack through the fluid coupling assembly,
    wherein said primary module includes a second fluid coupling construction at the other end of the module; and
    there is further provided at least one additional elongated tubularly-shaped and horizontally-positionable module, having a pair of ends and a fluid coupling construction at least one end for coupling engagement with the second fluid coupling construction and for fluid flow between the primary and additional module.

7. An apparatus as in claim 6 wherein said base portion further includes a plurality of fluid coupling constructions each constructed for coupling to a module fluid coupling construction.

8. An apparatus as in claim 7 wherein each module coupling construction is adapted to engage one of (a) another module fluid coupling construction and (b) a base fluid coupling constructions.

9. An apparatus as in claim 1 wherein the flow-rate through the module apertures is about the same as the flow rate between the base and module fluid coupling construction.

10. An apparatus for the collection and distribution of water comprising,
    an elongated, tubularly-shaped and horizontally-positioned module through which water can flow, having a bottom portion, an upper portion which is arcuately shaped and defines a plurality of flow apertures, and said module having a pair of ends, with a fluid coupling construction at one end, and
    an elongated, tubularly-shaped and vertically-positioned stack, said stack having a base portion and a body portion, said base portion having a fluid coupling construction and adapted to engage the fluid coupling construction on the module so as to form a fluid coupling assembly for the flow of water between the module and the stack, and said body portion of said stack constructed to extend vertically upwardly from the base portion, so that water can flow between the module and the stack through the fluid coupling assembly,
    wherein the water flow rate capacity of such module is at least about 3600 gallons per hour.

11. An apparatus as in claim 1 wherein there is further provided a pump for causing water flow between said stack and said module.

12. A treatment apparatus for treating pond water and constructed to be positioned in a wetlands zone associated with a pond said apparatus comprising:
    (A) an elongated, hollow and substantially horizontally disposed disbursement module which defines:
        1) a passageway for fluid flow;
        2) an upper portion defining a plurality of flow openings in communication with said passageway;
        3) a particulate-receiving bottom portion;
        4) a fluid coupling construction at one end of the passageway and in communication therewith;
        5) an inlet construction at the other end of the passageway having an inlet aperture in communication therewith, which aperture is substantially smaller than the passageway so as to promote the separation and deposition of particulate matter on said particulate receiving bottom portion; and
    (B) an elongated, hollow and vertically disposed stack formation which defines a fluid coupling construction adapted to couple to the coupling construction of the disbursement module so as to form a coupling assembly for communication between the stack formation and the disbursement module.

13. A treatment apparatus as in claim 12 being constructed so that the velocity of fluid within the passageway is about 90% less than the velocity of fluid at the inlet aperture.

14. A treatment apparatus as in claim 12 wherein the ratio of the cross sectional area of the inlet aperture to the cross sectional area of the passageway is about 1 to 10.

15. A treatment apparatus as in claim 12 which is constructed so that the fluid flow entering the inlet aperture and the fluid flow exiting the passageway through the flow openings is about the same.

16. A treatment apparatus as in claim 12 wherein the upper portion of the disbursement module is arcuately shaped and the bottom portion is essentially flat with said upper portion and said bottom portion being joined together.

17. A treatment apparatus as in claim 12 wherein the upper portion includes a plurality of spaced ribbed members and wherein said flow openings are positioned between and recessed below said ribbed members.

18. A treatment apparatus as in claim 12 wherein the vertical stack formation and horizontal disbursement module are at about right angles relative to each other, so as to form an "L-like" configuration.

19. A treatment apparatus as in claim 18 wherein the vertical stack formation and the horizontal disbursement module are positioned relative to one another at an angle less than about 90° and the horizontal module is sloped slightly toward the stack formation.

20. A treatment apparatus as in claim 12 wherein the stack formation includes a base portion and a body portion, said base portion including said coupling construction and said body portion constructed to extend vertically from the base portion.

21. A treatment apparatus as in claim 20 wherein said body portion is generally cylindrical.

22. A treatment apparatus as in claim 12 wherein said fluid coupling construction includes a tubularly-shaped member and said members are constructed to interfit with each other so as to form the fluid coupling assembly.

23. A treatment apparatus as in claim 12 wherein in cross section, the height of the horizontally positioned module is about 10" and the width of the module is about 12".

24. A treatment apparatus as in claim 20 wherein said base further includes at least one additional fluid coupling construction for coupling to a module fluid coupling construction.

25. A treatment apparatus as in claim 12 wherein the water flow capacity of said module is at least about 3600 gallons per hour.

26. A treatment apparatus as in claim 12 wherein there is further provided a pump for causing fluid flow between said stack and said module.

27. A treatment apparatus as in claim 12 wherein the disbursement module includes a plurality of adjacent sections which are coupled together and in fluid communication so that fluid flows between the inlet construction and the stacked formation.

28. A treatment apparatus as in claim 12 wherein a wetland zone includes a bottom and a top surface and said disbursement module is constructed to rest on the bottom and the stack formation is constructed to extend upwardly from the module toward the top surface.

29. A treatment apparatus as in claim 12 wherein there is further provided a cover for sealing engagement with the stack formation.

30. A water treatment apparatus for use in a water treatment pond to remove impurities from the water, said water treatment apparatus comprising:
a substantially horizontally disposed disbursement module having a first end, a spaced second end, a top and a bottom, said disbursement module including a water inlet positioned proximate said first end, said water inlet having a cross sectional area that is smaller than that of said disbursement module, the difference in cross sectional area between said water inlet and said disbursement module sufficient to promote the settlement of the impurities to said bottom of said disbursement module;
a plurality of exit apertures positioned along the length of said disbursement module, said exit apertures adapted to permit water to exit said disbursement module;
said disbursement module further including an outlet positioned proximate said second end of said disbursement module;
a hollow stack including a first end defining an entranceway and a second end spaced from said first end, said entranceway permitting the removal of the impurities that have collected at said second end of said stack;
said stack further including an opening that is in fluid communication with said entranceway, said opening of said stack adapted to permit connection of said outlet of said disbursement module to said stack in a manner that permits impurities collected within said disbursement module to gravitate toward and into said second end of said stack to permit removal of said impurities from said stack through said entranceway.

31. The water treatment apparatus of claim 30, wherein said outlet has a cross sectional area approximately the same as the cross sectional area of said opening of said disbursement module.

32. The water treatment apparatus of claim 30, wherein said disbursement module includes a plurality of spaced apart ribs positioned along its length.

33. The water treatment apparatus of claim 32, where in said exit apertures are positioned in recessed portions between said ribs.

34. The water treatment apparatus of claim 30, wherein said bottom surface of said disbursement module is flat.

35. The water treatment apparatus of claim 30, wherein said top surface of said disbursement module is arcuate.

36. The water treatment apparatus of claim 30 wherein said stack is adapted to extend above the surface of the water treatment pond.

37. The water treatment apparatus of claim 30, further including a cap adapted to cover said entranceway to said stack.

38. An apparatus as in claim 1 wherein the base portion includes a peripheral wall which defines a plurality of coupling constructions each adapted to engage a fluid coupling construction on a module.

39. An apparatus for collection and distribution of water and constructed to be positioned in a landscaping recess which defines a top and a bottom, comprising:
a substantially vertically positionable stack,
a substantially horizontally positionable module coupled to said stack for fluid flow therebetween,
said module being elongated, tubularly-shaped, horizontally positionable adjacent the bottom of the recess and having (a) a bottom portion, (b) an arcuately-shaped upper portion that defines a plurality of flow apertures, and (c) a fluid coupling construction at one end, said stack being elongated, tubularly shaped and having a base portion and a body portion, said base portion being positionable adjacent the bottom of the recess and having (a) a fluid coupling construction adapted to engage the fluid coupling construction on the module so as to form a fluid coupling assembly for the flow of water between the module and stack and (b) defining a base portion horizontal cross section, said body portion of said stack (a) constructed to extend substantially vertically and upwardly from the base portion to the top of the recess and (b) defining a body portion horizontal cross section, said base portion cross section being at least as large as said body portion cross section.

* * * * *

(12) INTER PARTES REEXAMINATION CERTIFICATE (0227th)
United States Patent
Beaulieu

(10) Number: US 7,114,668 C1
(45) Certificate Issued: Jan. 25, 2011

(54) CONSTRUCTED WETLANDS SYSTEM, TREATMENT APPARATUS AND METHOD

(75) Inventor: Edgar Beaulieu, Sugar Grove, IL (US)

(73) Assignee: Harris, N.A.,, Chicago, IL (US)

Reexamination Request:
No. 95/000,441, Apr. 10, 2009

Reexamination Certificate for:
Patent No.: 7,114,668
Issued: Oct. 3, 2006
Appl. No.: 10/804,622
Filed: Mar. 19, 2004

Related U.S. Application Data

(62) Division of application No. 10/138,974, filed on May 1, 2002, now Pat. No. 6,740,232.

(51) Int. Cl.
*B05B 1/18* (2006.01)

(52) U.S. Cl. .................. 210/170.09; 210/151; 239/207; 239/266; 239/273; 239/275; 239/279; 239/562; 239/565; 239/566; 239/567

(58) Field of Classification Search ........................ None
See application file for complete search history.

(56) References Cited

U.S. PATENT DOCUMENTS

| | | |
|---|---|---|
| 624,985 A | 5/1899 | Scott-Moncrieff |
| 681,884 A | 9/1901 | Monjeau |
| 2,153,789 A | 4/1939 | Carswell et al. |
| 2,388,795 A | 11/1945 | Montgomery et al. |
| 3,770,623 A | 11/1973 | Seidel |
| 4,209,388 A | 6/1980 | DeFraites |
| 4,345,998 A | 8/1982 | Graffis et al. |
| 4,966,534 A | 10/1990 | Hasslen, III |
| 5,174,897 A | 12/1992 | Wengrzynek |
| 5,437,786 A | 8/1995 | Horsley et al. |
| 5,522,672 A | 6/1996 | Moore |
| 5,584,991 A | 12/1996 | Wittstock et al. |
| 5,893,975 A | 4/1999 | Eifert |
| 5,921,711 A | 7/1999 | Sipaila |
| 5,951,866 A | 9/1999 | Grove et al. |
| 6,277,274 B1 | 8/2001 | Coffman |
| 6,428,691 B1 | 8/2002 | Wofford |
| 6,461,501 B1 | 10/2002 | Porter |

OTHER PUBLICATIONS

Aquascaper, Winter 2000, full magazine (49 pages, best copy available).

(Continued)

*Primary Examiner*—Jeffrey L. Gellner

(57) ABSTRACT

A system apparatus and method for treating water in a landscape pond so as to enhance the water clarity, where the water to be treated is delivered to a treatment pond to reduce the particulate matter and nutrient level of the water. The treatment pond includes a nutrient level reducing vegetation, faculative bacteria, substrate material for the bacteria (usually gravel) and a treatment apparatus. The treatment apparatus includes a generally vertically disposed hollow and cylindrical stack formation which extends between the treatment pond bottom and surface and defines at least one (1) coupling construction. At least one (1) elongated and generally horizontally disposed water disbursing module is positioned on the pond bottom and coupled to the stack formation. The disbursing module includes a flat bottom, an arcuate upper surface having a plurality of exit apertures therein and a pair of end formations, all of which define a passageway. In operation water flows from the decorative pond into the disbursing module. There due to geometry and pressure and velocity differences, particulate matter separates from the water and is deposited on to the disbursing module bottom and stack bottom. Water exits the exit apertures and travels through the substrate or gravel, is exposed to the nutrient level reducing vegetation and faculative bacteria and then returns to the decorative pond. The stack is provided with a sealing and removable cover which permits access to the stack bottom so as to remove sediment and particulate matter which has collected in the disbursing module bottom and/or stack bottom.

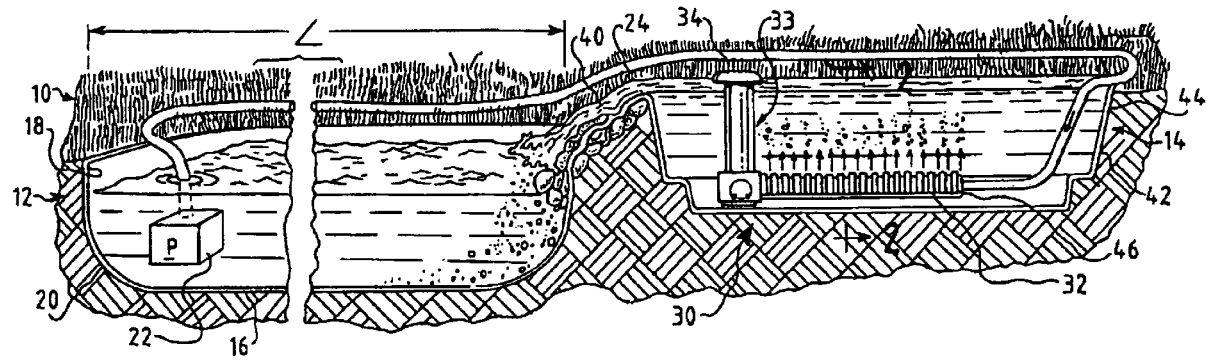

OTHER PUBLICATIONS

Advanced Construction Techniques, Aquascape Designs, Inc.; copyright 1998; p. 6–7 (2 pages; best available copy).

The ABC's of bog construction: Mother Nature's mega filterl: Builder Tips by Ed Beaulieu, Aqauascaper, Winter 2000, p. 19–21 (3 pages).

Low–Maintenance Water Gardens; Helen Nash, Chapter 2, Low–Maintenance Filtration & Water Quality, copyright 1996, pp. 31–53 (25 pages).

Constructed Wetlands Treatment of Municipal Wastewatersm, EPA Manual, Sep. 2000, Chapter 6, pp. 122–130 (16 pages).

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claim 7, 8, 24 and 3 8 is confirmed.

Claims 1-6, 9-23, 25-37 and 39 are cancelled.

\* \* \* \* \*